United States Patent
Lamraoui et al.

(10) Patent No.: US 12,446,986 B2
(45) Date of Patent: Oct. 21, 2025

(54) ASSEMBLY COMPRISING A MEDICAL DEVICE ADAPTED TO BE IMPLANTED AND PACKAGING FOR SAID DEVICE

(71) Applicant: UROMEMS, Grenoble (FR)

(72) Inventors: Hamid Lamraoui, Vaulnaveys le Haut (FR); Pierre Mozer, Vincennes (FR); Aurélien Beaugerie, Issy-les-Moulineaux (FR); Riaz Mir, Fontaine (FR); Thierry Ho, Saint Egreve (FR)

(73) Assignee: UROMEMS, Grenoble (FR)

( * ) Notice: Subject to any disclaimer, the term of this patent is extended or adjusted under 35 U.S.C. 154(b) by 788 days.

(21) Appl. No.: 17/781,253

(22) PCT Filed: Dec. 15, 2020

(86) PCT No.: PCT/FR2020/052449
§ 371 (c)(1),
(2) Date: May 31, 2022

(87) PCT Pub. No.: WO2021/123606
PCT Pub. Date: Jun. 24, 2021

(65) Prior Publication Data
US 2022/0409401 A1     Dec. 29, 2022

(30) Foreign Application Priority Data
Dec. 16, 2019 (FR) ................................. FR1914528

(51) Int. Cl.
*A61B 50/20* (2016.01)
*A61B 50/30* (2016.01)
(Continued)

(52) U.S. Cl.
CPC .............. *A61B 50/20* (2016.02); *A61B 50/30* (2016.02); *A61F 2/00* (2013.01); *A61F 2/0095* (2013.01);
(Continued)

(58) Field of Classification Search
CPC .......... A61F 2/00; A61F 2/0095; A61F 2/482; A61F 2/484; A61B 50/20; A61B 50/30;
(Continued)

(56) References Cited

U.S. PATENT DOCUMENTS

| 4,726,404 A | 2/1988 | Haber et al. |
| 10,350,044 B2 | 7/2019 | Lamraoui |

(Continued)

FOREIGN PATENT DOCUMENTS

| CN | 105377176 A | 3/2016 |
| CN | 107106282 A | 8/2017 |

(Continued)

OTHER PUBLICATIONS

PCT International Search Report in related PCT Application No. PCT/FR2020/052449, mailed Apr. 12, 2021.
(Continued)

*Primary Examiner* — John Kim
(74) *Attorney, Agent, or Firm* — Thomas | Horstemeyer, LLP

(57) ABSTRACT

The invention relates to an assembly formed by a medical device (1) adapted to be implanted in a human or animal body and by packaging, wherein: —the medical device comprises a housing (11) that encloses a fluid reservoir (13) and a fluid outlet (12) forming a fluid connection between the reservoir and a volume outside the housing; —the packaging includes a tank (2) comprising a bottom (20), a side wall (21), an upper face opposite the bottom in a vertical direction, and an opening configured to fill the tank with a
(Continued)

biocompatible fluid, the bottom (20) of the tank extending in a horizontal plane perpendicularly to the vertical direction;

—at least one of the bottom, the side wall and the top face comprises a first holding element (201) adapted to hold the housing in the tank, the housing (11) being held in the tank (2) by said first holding element (201) such that the reservoir is located between the bottom of the tank and the fluid outlet, said fluid outlet being arranged below the opening such that the fluid outlet is immersed in the fluid when the tank is filled with the biocompatible fluid.

19 Claims, 4 Drawing Sheets

(51) Int. Cl.
*A61F 2/00* (2006.01)
*A61F 2/48* (2006.01)
*A61J 1/22* (2006.01)
*G01M 3/02* (2006.01)
*G01M 3/32* (2006.01)
*A61B 50/00* (2016.01)

(52) U.S. Cl.
CPC .............. *A61F 2/482* (2021.08); *A61F 2/484* (2021.08); *A61J 1/22* (2013.01); *G01M 3/02* (2013.01); *G01M 3/32* (2013.01); *A61B 2050/005* (2016.02); *A61B 2050/0065* (2016.02)

(58) Field of Classification Search
CPC ....... A61B 2050/005; A61B 2050/0065; A61J 1/22; G01M 3/02; G01M 3/32
See application file for complete search history.

(56) References Cited

U.S. PATENT DOCUMENTS

| | | |
|---|---|---|
| 2012/0103840 A1 | 5/2012 | McCaffrey |
| 2015/0021221 A1 | 1/2015 | Hendrickson et al. |
| 2017/0056149 A1 | 3/2017 | Rajpara et al. |
| 2017/0325926 A1 | 11/2017 | Lamraoui |

FOREIGN PATENT DOCUMENTS

| | | |
|---|---|---|
| WO | 2015/009857 A1 | 1/2015 |
| WO | 2016083428 A1 | 6/2016 |

OTHER PUBLICATIONS

French Search Report in related, co-pending French Application No. FR 1914528, mailed Oct. 14, 2020.

Chinese Office Action in related Chinese Application No. 202080087098.2 mailed Oct. 22, 2024.

ASSEMBLY COMPRISING A MEDICAL DEVICE ADAPTED TO BE IMPLANTED AND PACKAGING FOR SAID DEVICE

CROSS REFERENCE TO RELATED APPLICATIONS

This application is the 35 U.S.C. § 371 national stage application of PCT Application No. PCT/FR2020/052449, filed Dec. 15, 2020, which application claims the benefit of French Application No. FR 1914528 filed Dec. 16, 2019, both of which are hereby incorporated by reference herein in their entireties.

TECHNICAL FIELD

The invention relates to an assembly comprising a medical device adapted to be implanted in a human or animal body comprising a fluid reservoir, and a packaging for said device.

STATE OF THE ART

Various implantable medical devices include a biocompatible fluid reservoir coupled to a fluid circuit. Such a fluid circuit may, for example, enable actuation of an element of the device.

For example, a device for selectively closing an anatomical duct, such as the urethra or bladder neck, may include an occlusive cuff surrounding said anatomical duct and fluidly coupled to a fluid reservoir. A pump is used to transfer fluid from the reservoir to the cuff so as to increase the compression exerted by the cuff on the duct, or from the cuff to the reservoir so as to reduce the compression exerted by the cuff on the duct.

Other applications involving a fluid reservoir in a medical device implanted in a patient's body relate to the inflation of a occluding balloon, or the filling of a prosthesis.

In general, the medical device adapted to be implanted is provided to the surgeon empty of any biocompatible fluid, in a packaging with sterile contents. The surgeon therefore has to expel the air and fill the reservoir with biocompatible fluid before implantation in the patient.

This filling operation has to be implemented so as to drain the fluid circuit of the air initially contained. Indeed, any air bubbles are likely to affect the operation of the implantable device and in particular its accuracy.

Another constraint of the filling operation is to maintain the sterility of the device.

Manual filling of the device by the surgeon extends the duration of the surgical procedure and induces a risk of contamination of the device, likely to induce infections or complications in the patient.

Pre-filled medical devices exist, but they have many disadvantages, such as for example during the sterilization step, where it has to be ensured that the fluid is also sterilized through the device.

BRIEF DESCRIPTION OF THE INVENTION

It is therefore a purpose of the invention to define a medical device adapted to be implanted comprising a fluid reservoir and a packaging for said device, which together allow minimizing the handling of the device prior to implantation.

To this end, the invention relates to an assembly of a medical device adapted to be implanted in a human or animal body and a packaging, wherein:
said medical device includes a casing enclosing a fluid reservoir and a fluid outlet forming a fluid connection between the reservoir and a volume external to the casing,
the packaging includes a tank comprising a bottom, a sidewall, an upper face opposite the bottom in a vertical direction and an opening configured to fill the tank with a biocompatible fluid, the bottom of the tank extending in a horizontal plane perpendicular to the vertical direction, at least one of the bottom, the sidewall and the upper face comprises a first holding element adapted to hold the tank in the tank,
the casing being held in the tank by said first holding element so that the reservoir is positioned between the bottom of the tank and the fluid outlet, said fluid outlet being arranged below the opening so that, when the tank is filled with the biocompatible fluid, said fluid outlet is immersed in the fluid.

Such an assembly has the advantage of providing a draining-friendly positioning of the medical device, with the fluid outlet located above the reservoir when the packaging is in its normal position of use in which the bottom of the tank lies on a horizontal surface, such as a table. Thus, once the tank is filled with a biocompatible fluid, the draining can be implemented without any handling of the device.

As used herein, "vertical" means a direction parallel to the direction of gravity, such as indicated by a plumb line, and "horizontal" means a direction contained in a plane perpendicular to said vertical direction. Furthermore, the terms "above" or "below" or "upper" or "lower" are understood to be relative to said vertical direction.

In some embodiments, said medical device comprises a tubing in fluid connection with the fluid outlet, the bottom and/or sidewall of the tank comprising a second holding element adapted to hold a portion of said tubing.

In some embodiments, the opening is arranged in the upper face of the tank. Alternatively, the opening is arranged in an upper portion of the sidewall.

In some embodiments, the packaging further comprises a cover that is removable from the tank so as to at least partially plug the opening.

Said cover may be configured to be secured to only a part of said at least one sidewall, the cover having at least one gripping zone remote from said at least one sidewall.

In some embodiments, the cover further has a third holding element adapted to hold the casing in the position in which the reservoir is positioned between the bottom of the tank and the fluid outlet.

Each holding element of the tank and, where applicable, the cover, may be in the form of a housing adapted to hold the casing and/or, if any, the tubing, by friction.

In some embodiments, the tank is formed by molding a plastic material and each housing may then be formed during the molding process.

In some embodiments, the tank includes a horizontality indicator of the bottom of the tank.

Said indicator may be a horizontality indicator of a fluid level in the tank.

In some embodiments, the packaging further comprises a tub adapted to contain the tank.

In some embodiments, said assembly further comprises a first seal permeable to a sterilizing gas integral with said at least one sidewall, the tub and the first seal together forming a sterile enclosure for the medical device.

Said assembly may further comprise a second seal permeable to a sterilizing gas plugging the tub, the tub and the second seal together forming a sterile enclosure for the tank.

In some embodiments, the reservoir includes a fixed wall and a wall movable with respect to the fixed portion to vary the volume of the reservoir, said variation in the volume of the reservoir being adapted for filling with a biocompatible fluid and draining a fluid circuit extending between the reservoir and the fluid outlet and doing so automatically.

Advantageously, the medical device comprises an electromechanical actuator arranged in the casing, said actuator being configured to move the movable wall of the reservoir to vary the volume of the reservoir.

In some embodiments, the casing comprises a single fluid outlet and a single fluid connection between the reservoir and said fluid outlet.

In some embodiments, the medical device is selected from the group consisting of an artificial sphincter, an artificial muscle, an electrical stimulator, a gastric band, a neurostimulator and a penile implant.

BRIEF DESCRIPTION OF THE DRAWINGS

Further characteristics and advantages of the invention will be apparent from the following detailed description, with reference to the appended drawings, in which.

DETAILED DESCRIPTION OF EMBODIMENTS

The medical device includes a casing made of a biocompatible material, such as titanium.

The casing contains a reservoir of biocompatible fluid and is provided with a fluid outlet that forms a fluid connection between the reservoir and the environment external to the medical device. Said fluid outlet may especially be connected to a tubing providing a fluid connection with an element external to the casing. Preferably, said biocompatible fluid is a liquid.

According to an alternative embodiment, the reservoir comprises a movable wall, driven by an actuator, the movement of which makes it possible to vary the volume of the reservoir controllably. This variation in volume allows fluid to be moved from the reservoir to the fluid outlet or from the fluid outlet to the reservoir.

Particularly advantageously, the actuator is an electromechanical actuator, which is controlled by a control unit to move the movable wall by a specified distance. The control unit can be arranged in the casing. The medical device is thus autonomous, in the sense that it does not require action by the practitioner to perform its function.

Furthermore, the device advantageously comprises a single fluid outlet and a single fluid circuit between the reservoir and the fluid outlet.

In some applications, the medical device is an artificial sphincter, intended to selectively occlude an anatomical duct by exerting a compressive force on said duct. In particular, the medical device may be an artificial urinary sphincter.

In such a device, the compression is exerted on the anatomical duct by means of an occlusive cuff connected to the fluid outlet of the casing by a tubing. The electromechanical actuator, by moving the movable wall, allows fluid to be transferred from the reservoir to the cuff or from the cuff to the reservoir, in order to adjust the compression exerted by the cuff.

Examples of such a medical device are described in WO 2016/083428.

Figure 1:
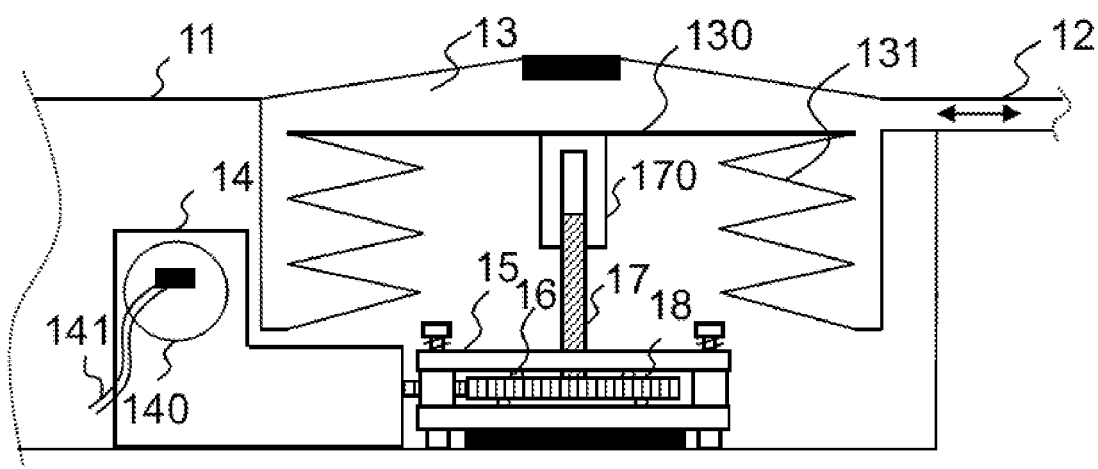
FIG. 1 is a cross-section view of the medical device according to one embodiment.

FIG. 1 illustrates one embodiment of the medical device. The medical device includes:
a hermetic casing 11 containing a gas,
a fluid outlet 12,
a fluid reservoir 13 having a variable fluid volume arranged in the casing in fluid connection with the fluid outlet 12.

Particularly advantageously, the reservoir comprises a fixed wall and a wall movable with respect to the fixed wall, a movement of said movable wall allowing the volume of the reservoir 13 to be varied.

According to an advantageous but non-limiting embodiment, the fixed wall of the reservoir may be formed in part of the inner wall of the casing 11, and the movable wall 130, which is preferably rigid, is connected to the fixed wall by a deformable bellows 131.

An actuator 14 is arranged in the casing 11 and mechanically coupled to the movable wall 130 to selectively vary the volume of fluid in said reservoir.

The actuator 14 may be adapted to control a linear movement of the movable wall 130, the bellows 131 being adapted to extend or compress as a function of said linear movement of the movable wall 130 controlled by the actuator 14.

The actuator 14 may be selected from any electromechanical system for transforming electrical energy into mechanical motion with the required power to enable movement at a required force and speed of the movable wall 130 of the variable volume tank 13. The actuator 14 may especially be a piezoelectric actuator, an electromagnetic actuator which may include a brush or brushless electromagnetic motor coupled or not coupled to a gearbox, an electroactive polymer, or a shape memory alloy.

The movable wall 130 may be translationally moved along a longitudinal axis by the action of a drive screw 17 integral with the movable wall 130. The movable wall 130 is coupled to the drive screw 17 by means of a nut 170 integral with the movable wall 130 and having an internal thread cooperating with the thread of the screw 17. The drive screw 17 may extend substantially along the longitudinal axis. A position of the drive screw 17 may correspond substantially to a center of the movable wall 130.

The actuator 14 is adapted to rotatably drive the drive screw 17, for example, through rotation of a gear. A rotation of the drive screw 17 about the longitudinal axis causes the movable wall 130 to move along the longitudinal axis, with the bellows 131 compressing or extending along the longitudinal axis accordingly.

The actuator 14 may include a motor 140 coupled to a gearbox. A connector 141 provides power to the motor 140 as a function of a motor operation command.

The gearbox is coupled to a gear wheel 18, which in turn is coupled to the drive screw 17, so as to transmit torque and rotation from the axis of the motor 140 to the drive screw 17. The drive system thus includes a nut coupled to the drive screw and rotatably movable on a double-acting ball stop about the axis of the screw under a driving action by the actuator 14, the nut being coupled to the screw such that rotation of the nut drives the screw only translationally in the direction of movement of the movable part.

Rotation of the screw 17 then translationally drives the nut, resulting in the movable wall 130 being translationally moved in a direction parallel to the axis of the screw, that is, in the direction of the longitudinal axis. The direction of movement of the movable wall 130 depends on the direction of rotation of the motor 140.

The gear wheel 18 is housed in a block 15 by means of ball bearings 16 that allow its rotation in the block 15.

Naturally, FIG. 1 shows one embodiment of the medical device only by way of illustration, and any other arrangement of a variable volume reservoir and actuator may be defined by the person skilled in the art to perform the function of said medical device.

Such a device differs from artificial sphincters comprising a pump manually operable by the patient, a pressure regulating balloon and a cuff, in that the device has controllable autonomous operation, without repetitive manual action by the patient.

In other applications, the medical device may be an artificial muscle, an electrical stimulator, a gastric band, a neurostimulator or a penile implant (non-limiting list).

Between the manufacturing site of the medical device and the operating room in which the medical device is implanted in a patient, the medical device is arranged in a packaging that is the object of this text. Said packaging is adapted to maintain the medical device sterile by protecting it from external contamination and to protect it from impact. In the packaging, the medical device is empty of biocompatible fluid, with filling of the fluid circuit being performed only in the operating room.

As described below, said packaging is further adapted to allow the fluid circuit to be drained without handling of the medical device by a practitioner in the operating room.

The packaging first comprises a tank in which the medical device is held in a so-called vertical position, that is in which the tank is positioned between the bottom of the tank and the fluid outlet.

The tank comprises a horizontal bottom, a sidewall, an upper face opposite the bottom in the vertical direction.

The tank includes at least one opening configured to allow filling of the tank with a biocompatible fluid.

The fluid outlet of the medical device is located below said opening, so that when the tank is filled, the entire medical device, including the fluid outlet, is immersed in the fluid.

To ensure that the filling of the tank with biocompatible fluid is sufficient to implement the draining method, the tank can advantageously include a visual water level indicator disposed in the top part of the tank. Advantageously, the volume of the tank and the position of the indicator have been chosen and dimensioned to allow the filling of the tank of the device. Alternatively, the tank can include a cavity in the upper part intended to receive an overflow of biocompatible fluid so as to regulate the running over of this fluid and avoid overfilling.

The medical device is held in the vertical position by a first holding element arranged on the bottom, the sidewall and/or the upper face of the tank.

According to one embodiment, said first holding element is in the form of a housing whose dimensions are adapted to receive a part of the casing by exerting a slight clamping action to hold it in the desired position, without damaging it.

Advantageously, said housing is arranged in the bottom of the tank.

According to a preferred embodiment, the tank is made, for example, by molding or forming a plastic material, and the housing is integrated into the bottom of the tank by molding or forming. The housing may, for example, be in the form of two parallel partitions spaced apart by the width of the casing.

In some embodiments, the medical device may be packaged with a tubing in fluid connection with the fluid outlet. In this case, the casing advantageously comprises a second holding element arranged on the bottom and/or sidewall of the tank to hold a portion of said tubing below the fluid outlet.

Advantageously, said second holding element is in the form of a housing arranged in the bottom of the tank, parallel to the casing housing. This housing may, for example, be in the form of two parallel partitions spaced apart by the diameter of the tubing.

According to an adapted embodiment, represented in the figures, the tank has a parallelepiped shape comprising a four-sided sidewall and a bottom, the side opposite the bottom being open. However, this particular shape is by no means limiting.

Thus, according to other embodiments not illustrated, the tank may have any other shape, such as a cylindrical shape, for example, with a cylindrical sidewall and a circular bottom.

Particularly advantageously, the bottom of the tank has substantially identical dimensions in two orthogonal directions in a horizontal plane, in order to ensure stability of the tank, and especially to avoid any tipping of the tank when the medical device is drained.

According to some embodiments not illustrated, the opening of the tank may not be located on the upper face of the tank but on the sidewall of the tank, preferably in an upper portion of said wall so as to be above the fluid outlet of the medical device.

In any case, the tank is dimensioned and the opening is arranged so that, when the bottom of the tank extends in a horizontal plane, the tank can be filled with biocompatible fluid at least to the level of the fluid outlet of the medical device, preferably above said outlet. Thus, upon draining, the entire fluid circuit extending between the reservoir and the fluid outlet can be filled with biocompatible fluid and drained of the air initially present. In particular, filling and draining can be performed through said fluid outlet, by varying the volume of the reservoir, without the need for any user intervention other than activation of said volume variation, thus avoiding any contamination.

Advantageously, the packaging further comprises a cover removable from the tank so as to at least partially plug the opening. The cover is preferably snap fitted onto the sidewall, and retained thereon by friction or snap fitting, for example.

According to a preferred embodiment, the cover is configured to be secured to only a part of the sidewall, the cover having at least one gripping zone spaced apart from the sidewall. For example, the cover may have an outline with a portion coinciding with the shape of the opening defined by the sidewall and a part recessed from the sidewall, to form a passage for the practitioner's fingers to facilitate gripping the cover.

Particularly advantageously, the cover has another holding element adapted to hold the medical device in the vertical position. This holding element may be in the form of a housing arranged facing the housing formed in the tank.

Thus, the medical device is held in the vertical position in two places, which improves its stability especially during its transport.

Like the tank, the cover can be made by molding or forming a plastic material, and the housing is integrated inside the cover by molding or forming. The housing may, for example, be in the form of two parallel partitions spaced apart by the width of the casing.

In some embodiments, the packaging includes a tub for containing the tank. The tub provides additional protection for the medical device against impact. Advantageously, the tub also forms a sterile enclosure for the tank, thereby enhancing protection of the medical device from external contaminants. Preferably, during the implantation procedure, the tub can be handled and opened outside the sterile room of the operating room so that the tank can be extracted from the tub and passed into the sterile room. The tank is then opened and handled by the practitioner in the sterile room. Furthermore, as explained below, the tub can be used in the draining method by being filled with biocompatible fluid.

Figure 2:
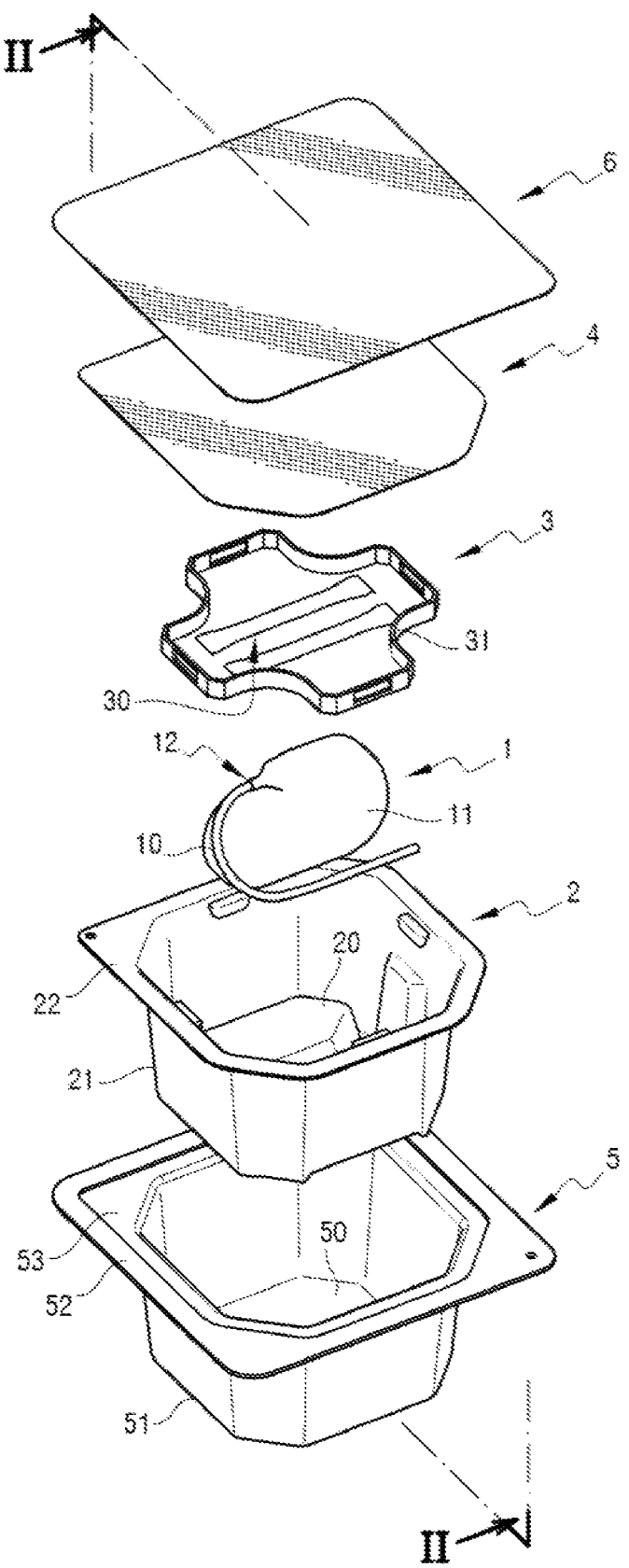
FIG. 2 is an exploded view of a packaging according to one embodiment.

The method for packing the medical device can be implemented as follows, with the packaging illustrated in FIG. 2.

The assembled medical device 1 is placed in the tank 2. To this end, the medical device is engaged in the holding element(s) provided in the tank to hold said device with the fluid outlet above the tank. When the fluid outlet is connected to a tubing, said tubing is preferably also engaged in the holding element(s) provided in the tank to hold said tubing at the bottom of the tank.

Figure 3:
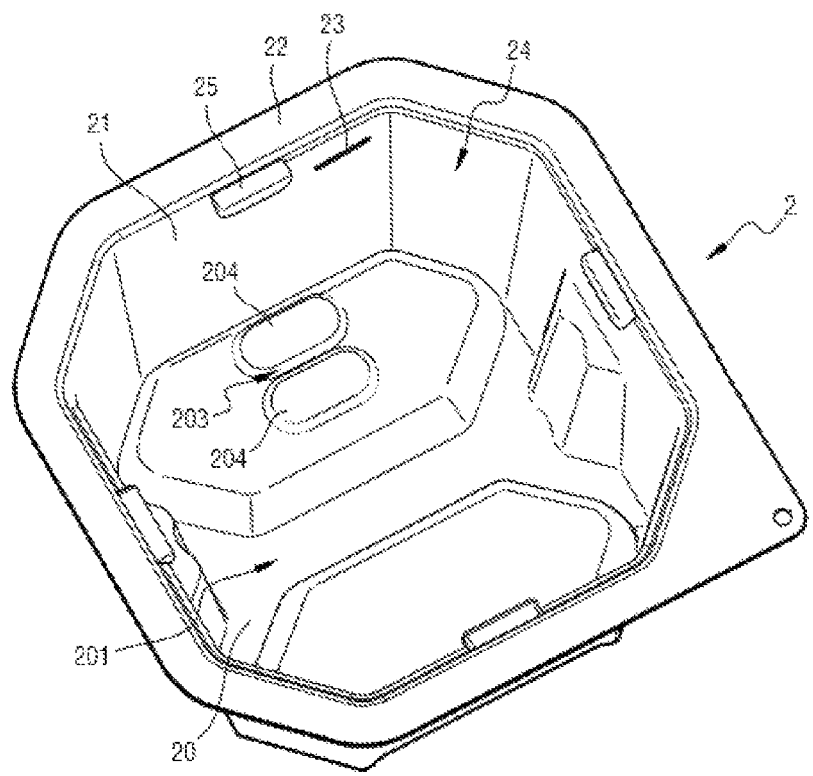
FIG. 3 is a perspective view of the tank.

With reference to FIG. 3, the tank 2 comprises a bottom 20 and a sidewall 21 extending substantially vertically from the bottom 20. On the side opposite the bottom 20, the sidewall 21 has an edge 22 that extends outwardly in a horizontal plane. Said edge 22 defines an upper face of the tank provided with an opening 24.

Figure 4:
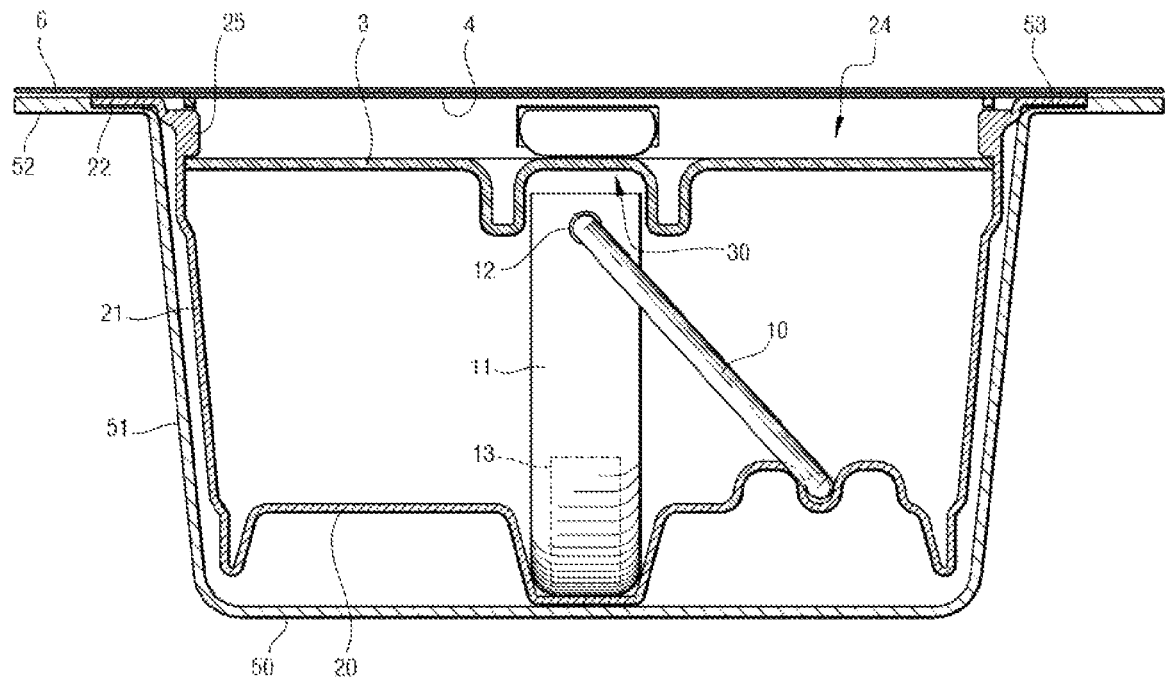
FIG. 4 is a cross-section view of the assembled packaging of FIG. 2.

As mentioned above with reference to FIG. 1, the medical device 1 includes a casing 11 in which a biocompatible fluid reservoir 13 is arranged (depicted in dotted lines in FIG. 4). The medical device 1 further comprises a fluid outlet 12 which is connected to the casing 11 and in fluid connection with the reservoir 13. The fluid outlet 12 provides a fluid connection between the reservoir and the outside of the casing. The fluid outlet 12 is connected to a tubing 10, which is intended to be connected, during implantation, to the occlusive cuff.

Figure 5:
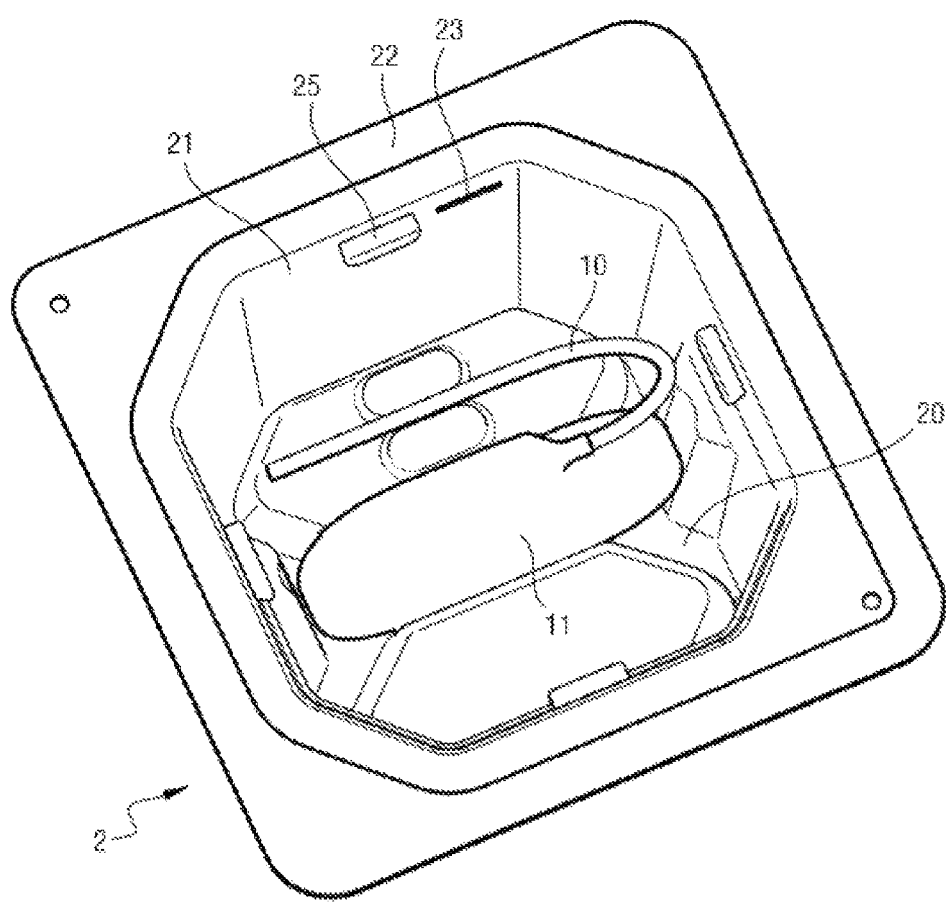
FIG. 5 is a perspective view of the medical device in its packaging.

The height of the sidewall 21 is greater than the height of the medical device in its vertical packing position. Thus, when the medical device 1 is arranged in the tank 2, as illustrated in FIGS. 4 and 5, the medical device is fully contained within the tank 2. The fluid outlet 12 is arranged below the opening 24, so that it can be covered with fluid when the tank is filled. The reservoir 13 is arranged below the fluid outlet 12 when the medial device is disposed in the tank.

The bottom 20 has a substantially square shape to ensure stability of the tank.

The bottom 20 of the tank 2 includes a housing 201 adapted to hold the medical device in a vertical position. The housing 201 is defined as a cavity formed in the bottom 20, parallel to one of the sides, and extends substantially between the middle of one side and the middle of the opposite side of the bottom 20. The location of the housing is in a central region of the bottom to ensure stability of the tank-medical device assembly when the medical device is arranged in the housing and the tank is filled with biocompatible fluid. The width of said housing is substantially equal to the width of the medical device, to allow the medical device to be inserted and held in said housing. The depth of the housing is chosen so as to avoid any topple of the casing 11; a depth of 5 to 15 mm is adapted to this function.

Particularly advantageously, the housing 201 is provided with two pairs of rounded protrusions (not illustrated), wherein the protrusions of each pair are arranged opposite each other in the width direction of the housing 201. Each pair of protrusions locally restricts the width of the housing 201 and thereby exerts a slight clamping action on the medical device to hold it in position.

The bottom 20 of the tank further includes a housing 203 for the tubing 10 of the medical device. The width of said housing is substantially equal to the diameter of the tubing. Said housing is in the form of two parallel studs 204 raised with respect to the bottom 20. Advantageously, as for the housing 201, the studs have a pair of rounded protrusions (not illustrated) facing each other in the width direction of the housing 203. Said pair of protrusions locally restricts the width of the housing 203 and thus exerts a slight clamping action on the tubing. Advantageously, the housing 203 is parallel to the housing 201.

Alternatively, the housing 201 could be defined by one or more pairs of studs facing each other, raised with respect to the bottom of the tank. As for the housing 203, it could be defined as a cavity in the bottom of the tank. Any other shape adapted to hold the medical device in a vertical position could be used.

The cover 3 is placed on the tank 2. The medical device is then engaged in the holding element(s) provided in the cover to hold said device with the fluid outlet above the tank.

For example, the cover may include, facing the housing 201, a housing 30 formed in the cover. The housing 30 may be defined by two raised studs with respect to the inner surface of the cover, or as a hollow formed in the inner surface of the cover. The width of the housing 30 is substantially equal to the width of the upper part of the medical device 1 in the vertical position.

Advantageously, the cover 3 is substantially cross-shaped. As a result, the cover only plugs a part of the upper opening of the tank 2, and leaves openings at the corners of the tank adapted for gripping the cover at gripping zones 31 by a practitioner.

The respective shapes and dimensions of the sidewall 21 and the edge of the cover 3 are chosen to allow the cover to be snap fitted into the tank. In particular, the sidewall 21 may comprise, in its upper part, a flange 25 adapted to retain a respective edge of the cover 3.

A first sheet 4 permeable to a sterilizing gas, for example a seal made of Tyvek™, is then sealed to the upper edge 22 of the tank.

The tank 2 is then placed in the tub 5.

The tub 5 has a similar shape to the tank 2 but larger dimensions. Preferably, the tub 5 is of sufficient size to fully receive the tank 2 while minimizing the free space between the tank 2 and the tub 5, in order to minimize the overall size of the packaging.

The tub 5 has a substantially planar bottom 50 and a sidewall that extends substantially vertically from the bottom 50. On the side opposite the bottom 50, the sidewall 51 has an edge 52 that extends outwardly in a horizontal plane. Said edge 52 defines an upper face of the tub provided with a central opening.

Advantageously, the tub 5 has an inner flange 53 providing a support for the flange 22 of the tank 2.

Like the bottom 20 of the tank, the bottom 50 of the tub 5 is substantially square to ensure good stability of the tub.

A second sheet 6 permeable to a sterilizing gas, such as a seal made of Tyvek™, is then sealed to the upper edge 52 of the tub 5.

The thus sealed packaging is sterilized by any adaptable means, and then packed in a box (not illustrated) which constitutes the outer envelope in which the medical device is delivered to a practitioner for implantation in a patient.

For this implantation, the practitioner takes the packaging out of the box, removes the second sealing sheet, takes the tank out and then removes the first sealing sheet.

According to one embodiment, the practitioner takes the tank out of the tub in order to fill it with biocompatible fluid.

To perform this filling and draining, the practitioner has to ensure that the bottom of the tank is horizontal.

Horizontality of the bottom of the tank can be ensured by placing the bottom of the tank on a flat, horizontal surface, such as a table.

This horizontality can be confirmed by means of a suitable indicator. For example, such a horizontality indicator may be an indicator of the horizontality of a water level in the tank. Such an indicator may, for example, be in the form of one or more segments formed in the tank, for example directly by molding or even by printing, and placed in the upper part of the tank, parallel to the bottom. Such an indicator may also serve as a filling indicator for the practitioner, indicating to him or her how high in the tank the biocompatible fluid should be poured to allow for effective draining. FIG. 3 illustrates one embodiment of such a horizontality indicator in the form of a hollow or raised interior line 23 extending in a horizontal plane within the sidewall 21. Preferably, said interior line 23 extends on several sides of the sidewall 21, either continuously or discontinuously.

An indication of the horizontality of the bottom of the tank may also be provided by the medical device itself. Indeed, the device generally includes an accelerometer arranged in the casing, which can be used, when the medical device is implanted, to determine a posture or activity of the patient. Since the casing is integral with the bottom of the tank with a determined orientation relative to it (usually perpendicular), the accelerometer can provide an indication of the inclination of the bottom of the tank.

Alternatively or additionally, this horizontality can be ensured by placing the tank in a container filled with a fluid. In this case, the tank is dimensioned so that when it contains the medical device in the position intended for draining, it floats in the container while maintaining the fluid outlet of the medical device above the tank.

The tub in which the tank is arranged in the packaging may be used as a container to this end.

The practitioner then fills the tank with biocompatible fluid that is intended for the operation of the medical device. Said fluid may be, for example, saline.

The practitioner then activates the actuator of the medical device to expel air present in the fluid circuit extending between the reservoir and the fluid outlet and into the tubing, if any, and to fill said fluid circuit and tubing with the biocompatible fluid. The actuator can be activated several times, for example three times, causing a movable wall of the reservoir to move to vary a volume of the reservoir and thus exert a pumping action, until the fluid circuit is completely drained (no air bubbles escaping from the fluid outlet).

This activation of the actuator does not require handling of the medical device itself. Indeed, the medical device includes wireless communication means with an outer remote control, which makes it possible to parameterize the device and to send it activation or deactivation orders.

Once the draining is completed, the practitioner can plug the fluid outlet or the end of the tubing if any, and take the medical device out of the tank for the implantation operation.

Thus, prior to implantation, the practitioner has not touched the medical device, thus avoiding or at least minimizing the risk of contamination of the device.

In addition, the practitioner's intervention is not required during the draining process. Indeed once the draining has been initiated, the device's actuator draws in biocompatible fluid and expels the air. This allows the practitioner to focus on other tasks, such as implantation preparation. Surgical time can thus be significantly reduced.

Finally, the fact that the draining process is automatic increases the reliability of the method.

It is understood that the embodiments described above are particular and non-limiting examples and that various modifications can be made without departing from the invention.

The invention claimed is:

1. An assembly of a medical device adapted to be implanted in a human or animal body and a packaging, wherein:
    said medical device includes a casing enclosing a fluid reservoir and a fluid outlet forming a fluid connection between the reservoir and a volume external to the casing,
    the packaging includes a tank comprising a bottom, a sidewall and an upper face opposite the bottom in a vertical direction, the bottom of the tank extending in a horizontal plane perpendicular to the vertical direction, at least one of the bottom, the sidewall and the upper face comprises a first holding element adapted to hold the casing in the tank, the tank further comprising an opening configured to fill the tank with a biocompatible fluid so as to fill a fluid circuit extending from the fluid outlet to the fluid reservoir of the medical device with said biocompatible fluid,
    the casing being held in the tank by said first holding element so that the reservoir is positioned between the bottom of the tank and the fluid outlet to allow draining the fluid circuit without handling the medical device, said fluid outlet being arranged below the opening so that when the tank is filled with the biocompatible fluid, said fluid outlet is immersed in the fluid.

2. The assembly according to claim 1, wherein said medical device comprises a tubing in fluid connection with the fluid outlet, the bottom and/or sidewall of the tank comprising a second holding element adapted to hold a portion of said tubing.

3. The assembly according to claim 1, wherein the opening is arranged in the upper face of the tank.

4. The assembly according to claim 1, wherein the opening is arranged in an upper portion of the sidewall.

5. The assembly according to claim 1, further comprising a cover removable from the tank so as to at least partially plug the opening.

6. The assembly according to claim 5, wherein the cover is configured to be secured to only a part of said at least one sidewall, the cover having at least one gripping zone remote from said at least one sidewall.

7. The assembly according to claim 5, wherein the cover further has a third holding element adapted to hold the casing in the position in which the tank is positioned between the bottom of the tank and the fluid outlet.

8. The assembly according to claim 1, wherein each holding element is a housing adapted to hold the casing by friction.

9. The assembly according to claim 8, wherein the tank is formed by molding a plastic material and wherein each housing is molded in one piece.

10. The assembly according to claim 1, wherein the tank includes a horizontality indicator of the bottom of the tank.

11. The assembly according to claim 10, wherein the horizontality indicator of the bottom of the tank is a horizontality indicator of a fluid level in the tank.

12. The assembly according to claim 1, further comprising a tub adapted to contain the tank.

13. The assembly according to claim 1, further comprising a first seal permeable to a sterilizing gas integral with said at least one sidewall, the tank and the first seal together forming a sterile enclosure for the medical device.

14. The assembly according to claim 13, further comprising a tub adapted to contain the tank and a second seal (6) permeable to a sterilizing gas plugging the tub (5), the tub and the second seal together forming a sterile enclosure for the tank.

15. The assembly according to claim 1, wherein the reservoir comprises a fixed wall and a wall movable with respect to a fixed part to vary the volume of the reservoir, said variation in the volume of the reservoir being adapted for filling with the biocompatible fluid and draining the fluid circuit.

16. The assembly according to claim 15, wherein the medical device comprises an electromechanical actuator arranged in the casing, said actuator being configured to move the movable wall of the reservoir so as to vary the volume of the reservoir.

17. The assembly according to claim 1, wherein the casing comprises a single fluid outlet and a single fluid connection between the reservoir and said fluid outlet.

18. The assembly according to claim 1, wherein the medical device is selected from the group consisting of an artificial sphincter, an artificial muscle, an electrical stimulator, a gastric band, a neurostimulator and a penile implant.

19. The assembly according to claim 1, wherein the medical device comprises a tubing in fluid connection with the fluid outlet and each holding element is a housing adapted to hold at least one of the casing and the tubing by friction.

* * * * *